(12) United States Patent
Shimizu et al.

(10) Patent No.: US 6,841,246 B2
(45) Date of Patent: Jan. 11, 2005

(54) WIRE FOR WELDING

(75) Inventors: Hiroyuki Shimizu, Fujisawa (JP); Mika Nishida, Kobe (JP); Kaoru Masuda, Kobe (JP); Kazuhiko Ito, Fujisawa (JP); Kuniaki Miyazaki, Fujisawa (JP); Norio Masaie, Fujisawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/960,487

(22) Filed: Sep. 24, 2001

(65) Prior Publication Data

US 2002/0037420 A1 Mar. 28, 2002

Related U.S. Application Data

(63) Continuation of application No. 09/190,264, filed on Nov. 12, 1998, now Pat. No. 6,337,144.

(30) Foreign Application Priority Data

Nov. 11, 1997 (JP) .............................. 9-309017
Nov. 11, 1997 (JP) .............................. 9-309023

(51) Int. Cl.[7] .......................... B32B 15/04; B32B 1/00; B23K 35/00; B05D 5/00
(52) U.S. Cl. ........................ 428/375; 428/385; 428/470; 427/59; 75/302
(58) Field of Search ................................ 428/457, 681, 428/213, 375, 270, 332, 357, 377, 378, 379, 380, 383, 385, 467, 464, 470, 421, 472, 624, 340; 427/449, 459, 460

(56) References Cited

U.S. PATENT DOCUMENTS

| 3,622,383 A | | 11/1971 | Dane ........................... 117/202 |
| 3,915,869 A | * | 10/1975 | Katono et al. ................. 252/12 |
| 4,211,662 A | * | 7/1980 | King ........................... 252/21 |
| 4,404,828 A | | 9/1983 | Blachford ....................... 72/42 |
| 4,913,927 A | | 4/1990 | Anderson ..................... 427/37 |
| 5,550,348 A | | 8/1996 | Masaie et al. ......... 219/145.22 |
| 6,010,984 A | * | 1/2000 | Heimann et al. ............ 508/136 |
| 6,068,918 A | | 5/2000 | Van Der Veer et al. ...... 428/379 |
| 6,079,243 A | * | 6/2000 | Inoue et al. .................... 72/41 |
| 6,337,144 B1 | * | 1/2002 | Shimizu et al. .............. 428/624 |

FOREIGN PATENT DOCUMENTS

| DD | 84056 | 8/1971 |
| EP | 0 303 734 | 2/1989 |
| FR | 2 245 780 | 4/1975 |
| GB | 1 344 292 | 1/1974 |

(List continued on next page.)

OTHER PUBLICATIONS

Webster's New World Dictionary of American English, Third College Edition, Simon & Schuster, Inc., 1988, p. 661.*
Patent Abstracts of Japan, vol. 010, No. 096 (M–469), Apr. 12, 1986, JP 60 231599, Nov. 18, 1985.
Patent Abstracts of Japan, vol. 095, No. 001, Feb. 28, 1995, JP 06 285678, Oct. 11, 1994.

*Primary Examiner*—Monique R. Jackson
(74) *Attorney, Agent, or Firm*—Oblon, Spivak, McClelland, Maier & Neustadt, P.C.

(57) ABSTRACT

A welding wire of the type consists of a plated or uncovered solid wire and a flux-cored wire for carbon steel or stainless steel, wherein one or more of hydrocarbon compounds selected from the group consisting of saturated or unsaturated hydrocarbon compounds, which have from 5 to 12 carbon atoms and a linear or branched structure, and hydrocarbon compounds having a cyclic structure are deposited on a wire surface. A lubricating oil and/or lubricating particles are chemically combined with a wire surface through the one or more hydrocarbon compounds. The total amount of the hydrocarbon compounds, and a lubricating oil and/or lubricating particles deposited on the wire surface is in the range of 0.1 to 5 g per 10 kg of the wire.

47 Claims, 4 Drawing Sheets

(a)

(b)

FOREIGN PATENT DOCUMENTS

| | | | |
|---|---|---|---|
| GB | 2 106 547 | | 4/1983 |
| JP | 51-72937 | | 6/1976 |
| JP | 51-144353 A | * | 12/1976 |
| JP | 01166898 | | 6/1989 |
| JP | 1-170600 | | 7/1989 |
| JP | 2-284792 | | 11/1990 |
| JP | 06285678 | | 10/1994 |
| JP | 8-206879 | | 8/1996 |
| JP | 8-229697 | | 9/1996 |
| JP | 09-122974 A | * | 5/1997 |
| JP | 09-122974 A | | 5/1997 |
| JP | 9-122974 | | 5/1997 |
| JP | 09141489 | | 6/1997 |

* cited by examiner (a)

(b)

(a)

(b)

(a)

(b)

WIRE FOR WELDING

This application is a continuation of Ser. No. 09/190,264, filed on Nov. 12, 1998, now U.S. Pat. No. 6,337,144.

BACKGROUND OF THE INVENTION

1. Field of the Invention

This invention relates to a wire for welding which is adapted for use in automatic or semi-automatic welding of carbon steels or stainless steels, and more particularly, to a welding wire capable of improving feedabilities of the wire. The invention is applicable to both plated wires and uncovered or void wires.

2. Description of the Prior Art

Where welding wires are employed for automatic or semi-automatic welding, it is necessary to stably feed a wire from a spool or a wire accommodation pack to an arc-welding position. This welding wire is conveyed via the inside of a spring liner, such as a conduit cable, to the arc-welding portion. When the ease in the passage of a welding wire through a spring liner is defined as feedabilities of the wire, a welding wire exhibiting good feedabilities is able to pass through a long conduit cable by application of a small feeding force thereto. At welding spots wherein long conduit cables are frequently used such as in shipbuilding yards, it is essential that the feedabilities of a welding wire be good.

In welding spots where the feed system of welding wires is under severe conditions, welding over a long time causes skin or film dust to be deposited on feed rollers and in the inside of a spring liner, thereby inducing the feed failure of the wire. In order to improve the feedabilities of a welding wire, usual practice is to apply various types of lubricants having good slip properties to the surfaces of the wire. For improving slip properties, there has been proposed a wire for welding wherein the feedabilities of a wire are improved, for example, by applying, onto the surfaces of a welding wire, lubricating oils such as plant oils (e.g. palm oil) and animal oils (e.g. lard oil) and the particles of lubricating substances such as graphite and molybdenum disulfide (Japanese Laid-open Patent Application No. Hei 6-285678). When these lubricant oils and lubricating particles are applied onto a wire surface in appropriate amounts, the friction coefficient between the wire surface and the inner wall portions of a spring liner can be reduced, and thus, they show good lubricity, thereby improving the feedabilities of the wire.

Moreover, there are known other methods including a method (Japanese Laid-open Patent Application No. Hei 1-166898) wherein a sodium or potassium salt of a higher fatty acid having a great number of carbon atoms and having a linear or branched structure, e.g. stearic acid, oleic acid, linolic acid or linoleic acid is deposited on the surfaces of a wire, followed by final wire drawing and further application of a lubricant oil on the resultant wire to improve the feedabilities of the wire. Another method (Japanese Laid-open Patent Application No. Hei 2-284792) includes depositing, on wire surfaces, an oil lubricant containing sodium or potassium salts of carboxylic acids thereby improving the feedabilities of the wire. In both methods, the feedabilities of wires are improved by depositing, on wire surfaces, appropriate amounts of alkali metal salts of higher fatty acids and lubricating oils.

However, these known techniques have the following disadvantages. Initially, with the case of the welding wire (Japanese Laid-open Patent Application No. Hei 6-285678) wherein the feedabilities of the wire are improved by application of lubricating oils and lubricating substances made of molybdenum disulfide and graphite onto the wire surface, when the wire is subjected to welding operations over a long time, the lubricating substance is deposited on the inner walls of a spring line, thereby causing the liner to be clogged. Thus, the smooth feed of the wire is inconveniently impeded. This is for the reason that because the lubricating substance is not bonded to the wire surface, the lubricating substance readily separates from the wire surface.

On the other hand, in the method (Japanese Laid-open Patent Application No. Hei 1-166898) wherein a sodium or potassium salt of a higher fatty acid is deposited on a wire surface, followed by wire drawing and application of lubricating oils, and also in the method (Japanese Laid-open Patent Application No. Hei 2-284792) wherein an oil lubricant containing sodium or potassium salts of carboxylic acids is deposited on the surface of a wire, when welding is continued over a long time, like the first case, the alkali metal salt of a higher fatty acid and the lubricating oil are separated from the wire surface and deposited in the inside of a spring liner, thereby causing the spring liner to be clogged. Eventually, the feedabilities of the wire lower. Presumably, this is due to the fact that since the chain length of the hydrocarbon moiety of the carboxylate is too long, the bonding force between the wire surface and the lubricating oil is weak. This permits easy separation of the lubricating substance from the wire surface, thereby causing a deposit to be built up in the spring line. Moreover, the metal salts of higher fatty acids including sodium stearate serve as a good lubricant used for wire drawing, and such metal salts of higher fatty acids having a high molecular weight are apt to form a strong thick film on the surface of a wire. Thus, although the slip properties of the wire are improved, there is the fear that the wire may slip at feed rolls, thereby inducing a feeding failure. Especially, when a wire is plated, slipping may peel off the plated film.

SUMMARY OF THE INVENTION

It is therefore an object of the invention to provide a wire for welding which overcomes the disadvantages of the prior art counterparts and which has, on the surface thereof, a lubricating oil chemically combined therewith, so that when the wire is used for welding over a long time, the lubricating substance is not separated from the wire and any inconvenience, such as clogging of a spring liner in the inside thereof, is not caused by use of the wire.

It is another object of the invention to provide a wire for welding which has improved wire feedabilities, ensuring stable, smooth feed thereof.

According to the invention, there is provided a welding wire of the type which consists of a plated or uncovered solid wire or a flux-cored wire adapted for welding of carbon steels or stainless steels, wherein at least one hydrocarbon compound selected from the group consisting of saturated and unsaturated hydrocarbon compounds having 5 to 12 carbon atoms and a linear or chained structure, and hydrocarbon compounds having a cyclic structure, the at least one hydrocarbon compound being present or deposited on a wire surface.

The above-mentioned saturated or unsaturated hydrocarbon compounds having a linear or branched-chain structure are called "chain compound".

Examples of the chain compound include carboxylic acids or metal carboxylates. The carboxylic acid is one selected from the group consisting of pentanoic acid, caproic acid, caprylic acid, octylic acid, secanoic acid, decanoic acid, lauric acid, linderic acid, and metal carboxylates include those salts of the above-mentioned careboxylic acids and metals selected from Li, Na, Mg, Al, K, Ca, Ti, Cr, Mn, Fe, Co, Ni, Cu, Zn, Zr, Sn, Cs, Pb and Ce.

The hydrocarbon compounds having a cyclic structure preferably include carboxylic acids and metal carboxylates. Preferable examples of the hydrocarbon compound having a cyclic structure include naphthenic acid and metal naphthenates having a ring structure such as a five-membered ring or a six-membered ring.

The metal naphthenates include one or more naphthenates of metals selected from the group consisting of Li, Na, Mg, Al, K, Ca, Ti, Cr, Mn, Fe, Co, Ni, Cu, Zn, Zr, Sn, Cs, Pb and Ce.

Moreover, the hydrocarbon compounds may be mixtures of naphthenic acid and metal naphthenates containing metals selected from the group consisting of Li, Na, Mg, Al, K, Ca, Ti, Cr, Mn, Fe, Co, Ni, Cu, Zn, Zr, Sn, Cs, Pb and Ce.

Further, it is preferred that at least one lubricating oil selected from animal and plant oils, mineral oils and synthetic oils are further present on the surface of a wire. Alternatively, at least one type of lubricating particle having slip properties and selected from the group consisting of molybdenum disulfide, tungsten disulfide, graphite carbon and polytetrafluoroethylene may be present on the wire surface. In this case, it is preferred that the total amount of the hydrocarbon compound having such a chain structure or cyclic structure as mentioned above and the lubricating oil, or the total amount, on the wire surface, of the chain compound or the hydrocarbon compound having such a cyclic structure as mentioned above and the lubricating particles is in the range of 0.1 to 5 g per 10 kg of the wire.

BRIEF DESCRIPTION OF THE DRAWINGS

FIGS. 1(a) and 1(b) are, respectively, schematic views illustrating how a lubricating oil made of a chain compound having from 5 to 12 carbon atoms and oriented on a wire surface and lubricating particles are fixed to a wire surface wherein FIG. 1(a) shows the case using a uncovered wire for welding, and FIG. 1(b) shows the case using a plated wire for welding;

FIGS. 2(a) and 2(b) are, respectively, schematic views illustrating how a lubricating oil made of a cyclic fatty acid or a cyclic fatty acid salt oriented on a wire surface and lubricating particles are fixed to a wire surface wherein FIG. 2(a) shows the case using an uncovered wire for welding, and FIG. 2(b) shows the case using a plated wire for welding;

FIGS. 3(a) and 3(b) are, respectively, schematic views showing the state where a chain or cyclic hydrocarbon compound alone is present on or at wire surfaces wherein FIG. 3(a) shows the case using a chain hydrocarbon compound, and FIG. 3(b) shows the case using a cyclic hydrocarbon compound.

PREFERRED EMBODIMENTS OF THE INVENTION

Figure 1:
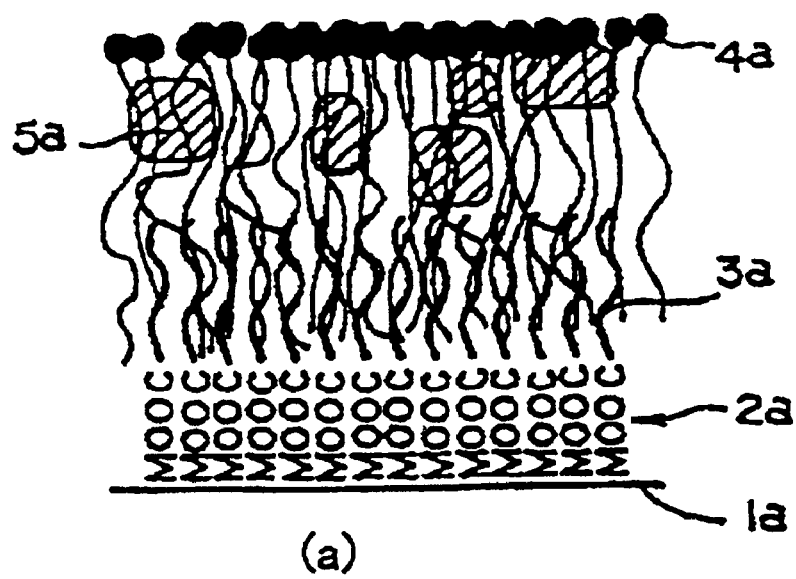
Figure 1:
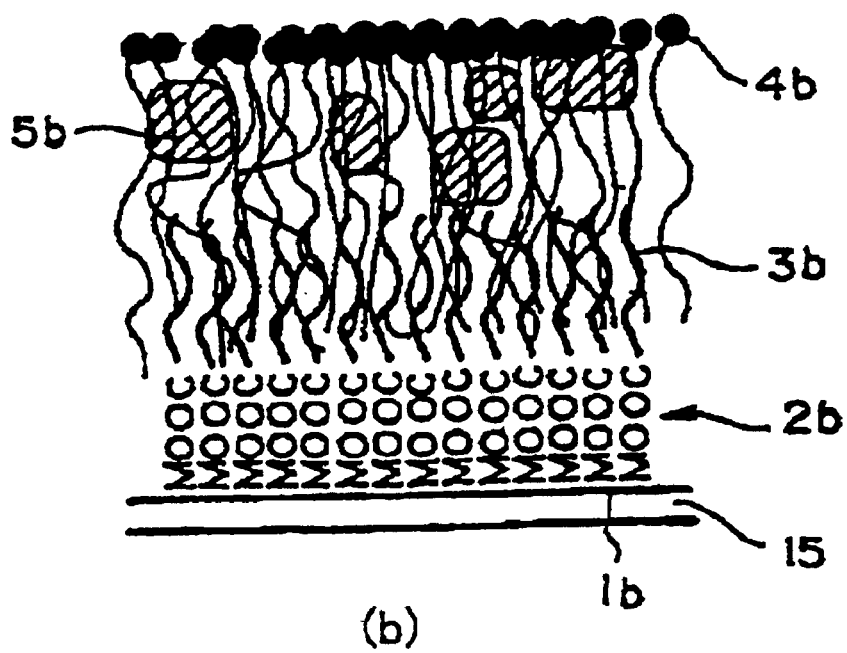

In order to reduce the coefficient of dynamic friction between the wire surface and the wire guide inner surface in a conduit cable, such as a spring liner or a teflon tube, it is necessary that a lubricating oil (e.g. an animal or plant oil, a mineral oil, a synthetic oil or a mixture thereof) having a melting point (softening point) and a viscosity adapted for use conditions of a wire and lubricating particles (made of molybdenum disulfide, tungsten disulfide, graphite carbon, polytetrafluoroethylene or the like) having good slip properties be present on the wire surface (lubricating oils and lubricating particles being hereinafter referred generically as lubricating material). If these lubricating materials are uniformly attached to or deposited on the wire surface in an appropriate amount per apparent unit area of the wire surface or per unit weight of the wire, the feedabilities of the wire immediately after commencement of welding are improved. However, if a lubricating material is merely physically applied to, i.e. if a lubricating material is attached to wire surfaces only by the action of the wettability of a lubricating oil, the lubricating material readily separates from the wire surfaces after welding over a long time. This entails easy clogging within the conduit cable. This means that the feedabilities are impeded conversely with the lubricating material, which has been added or applied to the wire surface so as to improve the wire feedabilities. In order that the lubricating material is prevented from being separated from the wire surface and deposited in the conduit cable, it is sufficient to chemically combine the wire surfaces and a lubricating oil together.

We made intensive studies to solve the problems involved in this art, and as a result, found that when a chain compound having from 5 to 12 carbon atoms or a hydrocarbon compound having a cyclic structure is present on wire surfaces and between the wire surface and a lubricating oil and/or lubricating particles, the wire feedabilities can be enhanced, thereby suppressing a conduit cable from clogging. The chain compound having from 5 to 12 carbon atoms and the hydrocarbon compound having a cyclic structure have the likelihood of being oriented in a certain direction on the metal surface.

The chain compounds having from 5 to 12 carbon atoms, which consist of carboxylic acids (hereinafter referred to as lower fatty acid or acids) and carboxylates (hereinafter referred to as lower fatty acid salt or salts), act to chemically combine wire surfaces and lubricant oils therethrough. The wire feedabilities have been intensively studied by applying various types of substances onto a wire surface, whereupon it has been found that pentanoic acid having 5 carbon atoms and metal salts thereof, and lauric acid having 12 carbon atoms and metal salts thereof and lindric acid having 12 carbon atoms and metal salts thereof serve as a kind of paste or binder for fixing a lubricating oil to wire surfaces. Since these lower fatty acids and lower fatty acid salts are able to fix lubricating oils to wire surfaces, lubricating particles (e.g. molybdenum disulfide, tungsten disulfide, graphite carbon and polytetrafluoroethylene), which are wetted with a lubricating oil and are present on a wire surface and which have slip properties, are also fixed to the wire surface.

The mechanism of the chemical combination through such a lower fatty acid or salt thereof is considered as follows. The fatty acids or salts thereof are characteristically allowed to orient in a certain direction on a metal surface. In general, where a carboxyl group having polarity is combined with a metal at the surface thereof, a hydrocarbon chain or moiety turns toward a direction normal to the metal surface. When the hydrocarbon chain joined to a carboxyl group is short in size, like lower fatty acids or salts thereof, the tendency of the orientation along a direction normal to the metal surface becomes pronounced, under which the metal surface is uniformly covered with short-sized molecules of a lower fatty acid or salt thereof.

Likewise, a hydrocarbon compound having a cyclic structure, which consists of a carboxylic acid (hereinafter referred to cyclic fatty acid) or a metal salt thereof (hereinafter referred to cyclic fatty acid salt), acts to chemically combine the wire surface and a lubricating oil therethrough. Since the hydrocarbon compounds having a cyclic structure, more or less, have slip properties, they act to improve the wire feedabilities at a portion where a lubricating oil is insufficient in amount. As a result of intensive studies on various types of substances being applied onto a wire surface, it has been found that naphthenic acid and metal salts thereof having a cyclic structure, which have been in wide industrial use as a dryer for paint and are inexpensive, have slip properties, and act as a kind of or binder for fixing a lubricating oil to the wire surface. Since these cyclic fatty acids or cyclic fatty acid salts permit a lubricating oil to be fixed to a metal surface, they have the effect of fixing lubricating particles (e.g. molybdenum disulfide, tungsten disulfide, graphite carbon and polytetrafluoroethylene), which are wetted with a lubricating oil and are present on the wire surface, to the wire surface.

The chemically combining mechanism of such cyclic fatty acids or salts thereof is considered to occur in the following manner. The cyclic fatty acids or salts thereof function to orient in a certain direction on a metal surface. In general, where a carboxyl group having polarity is combined with a metal surface, the hydrocarbon chain turns toward a direction normal to the metal surface. Moreover, where the hydrocarbon chain is in the form of a ring, the ring plane of the cyclic structure has a strong tendency to orient in parallel to the metal surface. Accordingly, carboxylic acids (cyclic fatty acid) having a cyclic structure or metal salts thereof (cyclic fatty acid salts) exhibit a stronger bonding force to the metal surface than with the case using linear carboxylic acids or linear carboxylic acid salts wherein they are oriented merely on the metal surface. Thus, the metal surface is very strongly, uniformly covered with the molecules of a cyclic fatty acid or salt thereof. The hydrocarbon chain per se having such a cyclic structure exhibits slip properties.

FIGS. 1($a$) and 1($b$) are, respectively, a schematic view showing the mechanism of fixing, to a wire surface, a lubricating oil and lubricating particles through a chain compound having from 5 to 12 carbon atoms. FIG. 1($a$) shows a case using an uncovered wire for welding, and FIG. 1($b$) shows a case using a plated or metallized wire for welding. As shown in FIG. 1($a$), the molecules of a chain compound 2$a$ are each outwardly oriented toward a direction normal to the surface of a uncovered welding wire, and each hydrocarbon chain 3$a$ is also outwardly oriented from the end of the chain compound 2$a$ toward a direction normal to the wire surface. The hydrocarbon chains 3$a$ are uniformly covered with molecules of a lubricating oil 4$a$ thereon. In this way, the hydrocarbon chains 3$a$ and the lubricating oil 4$a$ are chemically combined, and lubricating particles 5$a$, such as molybdenum disulfide, are taken in between the hydrocarbon chains 3$a$ and the lubricating oil 4$a$ and are thus stabilized.

FIG. 1($b$), in which a wire used is metallized or plated, differs from FIG. 1($a$) in that molecules of a chain compound 2$b$ are oriented from the surface of a metal skin 15. More particularly, hydrocarbon chains 3$b$ of the chain compound 2$b$, which are oriented in a direction normal to the plated wire surface, and molecules of a lubricating oil 4$b$ are chemically combined, between which lubricating particles 5$b$ are taken in and stabilized.

Figure 2:
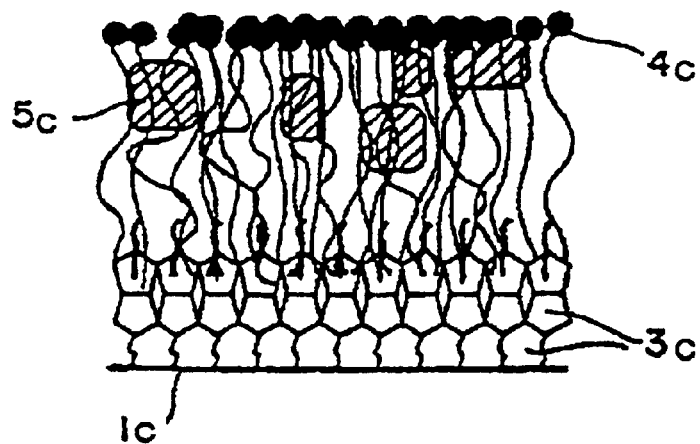
Figure 2:
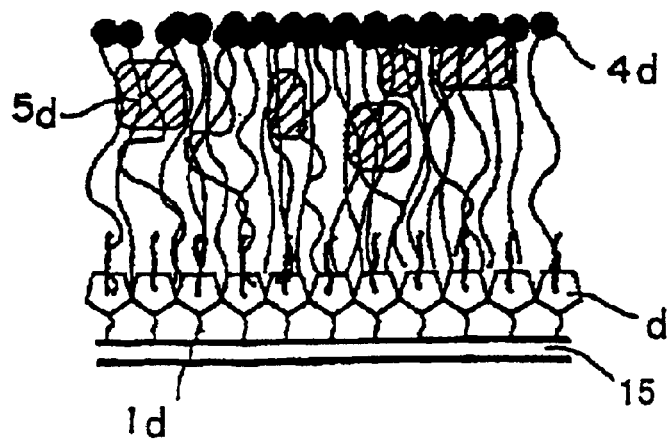

FIGS. 2($a$) and 2($b$) are, respectively, a schematic view showing the mechanism of fixing, to a wire surface, a lubricating oil and lubricating particles through a cyclic hydrocarbon compound. FIG. 2($a$) shows a case using an uncovered welding wire, and FIG. 2($b$) shows a case using a plated welding wire. As shown in FIG. 2($a$), cyclic hydrocarbon moieties 3$c$ of a cyclic hydrocarbon compound are oriented at a surface 1$c$ of an uncovered welding wire in such a way that part of the cyclic structure is in parallel to the wire surface. A carboxyl group, which is a kind of linear hydrocarbon chain, extending from each cyclic hydrocarbon moiety 3$c$ is outwardly oriented toward a direction normal to the wire surface 1$c$. Molecules of a lubricating oil 4$c$ uniformly cover the molecules of the cyclic hydrocarbon 3$c$ as shown. The cyclic hydrocarbon moiety 3$c$ and the lubricating oil 4$c$ are chemically combined, and lubricating particles 5$c$, such as molybdenum disulfide, are taken in between the cyclic hydrocarbon 3$c$ and the lubricating oil 4$c$ and stabilized.

Likewise, when using a plated wire, cyclic hydrocarbon 3$d$ is oriented at a surface of a metal skin in such a way that part of the cyclic structure is in parallel to the wire surface as is particularly shown in FIG. 2($b$). Like the above-mentioned case, the cyclic hydrocarbon 3$d$ and the lubricating oil 4$d$ are chemically combined, between which lubricating particles 5$d$ are taken in and stabilized.

Figure 3:
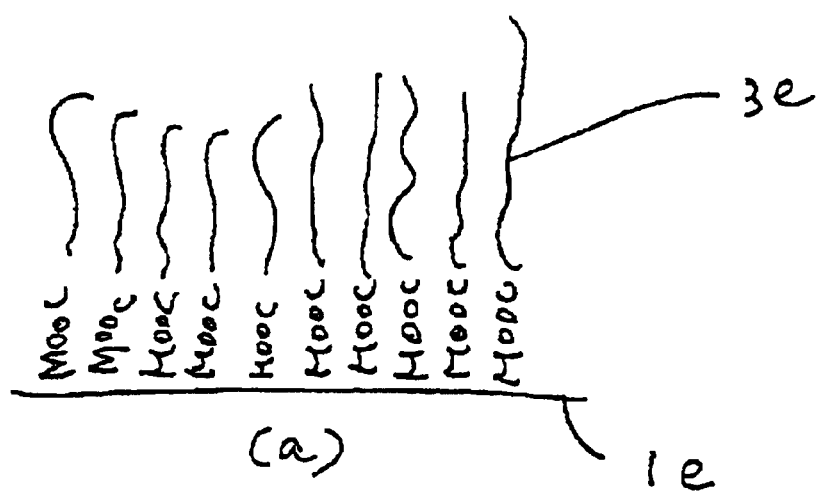
Figure 3:
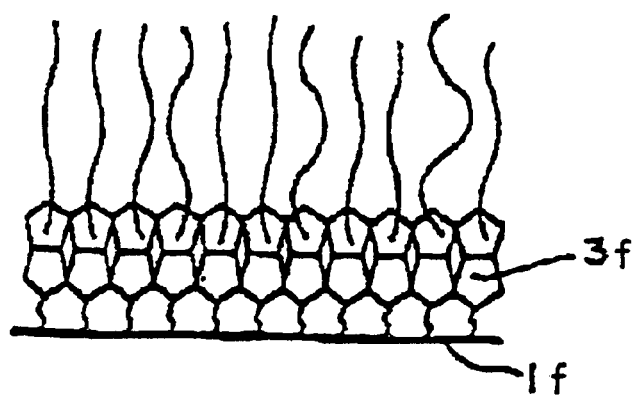

FIGS. 3($a$) and 3($b$) are, respectively, schematic views showing how a chain hydrocarbon compound having from 5 to 12 carbon atoms and a cyclic hydrocarbon compound are present on a wire surface when they are used singly. It will be noted that FIG. 3($a$) shows a case using a chain hydrocarbon compound, and FIG. 3($b$) shows a case using a cyclic hydrocarbon compound. If a chain or cyclic hydrocarbon compound alone is present on the wire surface as shown in FIGS. 3($a$) and 3($b$), a slight degree of slippage may be expected. Presumably, this is because a linear hydrocarbon chain of a chain hydrocarbon 3$e$ or cyclic hydrocarbon 3$f$ exhibits slip properties.

As set out above, hydrocarbon chains of lower fatty acids or lower fatty acid salts, or cyclic hydrocarbons and linear hydrocarbon chain moieties of such cyclic hydrocarbons are oleophilic in nature, and thus have good affinity for lubricating oils. In practice, a uniform thin film of a lower fatty acid or its salt, or a cyclic fatty acid or its salt is initially formed on a wire surface, on which a lubricating oil covers. Moreover, lubricating particles, such as molybdenum disulfide, are taken in the film of the lubricating oil and stabilized. In this manner, the lubricating material made of a lubricating oil and/or lubricating particles are chemically combined with the wire surface through the molecules of a lower fatty acid or its salt, or a cyclic fatty acid or its salt. Accordingly, the kinetic coefficient of friction between the wire surface and the inner walls of a spring liner can be reduced, thereby preventing the lubricating material from being separated from the wire surface.

The reasons are described as to why the number of carbon atoms in chain compounds to be applied onto the surfaces of a welding wire according to the invention is determined as defined before.

Carbon atoms of chain compounds: 5 to 12

As to chain compounds having 13 or more carbon atoms (higher fatty acids and their salts), extensive studies were made by use, for example, of stearic acid or metal salts thereof, but any significant effect could not be obtained. This is considered for the reason that the carbon chain is longer than as necessary, so that chain compounds having 13 or more carbon atoms are unlikely to orient on a wire surface. When metals salts of stearic acid were applied onto a wire surface, the wire was slipped at feed rollers therefor. The reason for this is considered as follows: as will be apparent from the fact that metal salts of fatty acids having such a great molecular weight as metal stearates have been employed as a lubricant for wire drawing, application of a metal salt of a fatty acid having a great molecular weight onto a wire surface tends to form a strong, thick film on the wire surface. The film of such metal salts of higher fatty acids is very likely to induce the slippage of a wire at feed rollers in the course of automatic welding or semi-automatic welding. On the other hand, with respect to chain compounds having 4 or less carbon atoms, butanoates and acetates were tested, for example. As a result, it was found that as the number of carbon atoms decreases, the function of the carbon chain as an oleophilic group becomes weakened, and it cannot be expected that these salts effectively serve as a kind of paste or binder for fixing a lubricating oil. In this way, chain compounds useful in the present invention are defined as ones having from 5 to 12 carbon atoms. Hence, there can be obtained an ideal film, which exhibits lubricity when undergoing friction at a relatively low pressure as experienced in the inside of a spring liner and has such a characteristic that the lubricating film breaks when suffering friction at high pressure imposed with feed rollers.

As stated hereinabove, lower fatty acids or salts thereof are very effective as a kind of paste for fixing a lubricating material to a wire surface. The wire feedabilities are improved without causing a spring line to be clogged therein upon welding over a long time, thus enabling one to weld while permitting stable feed of the wire and a low feed resistance Next, hydrocarbon compounds having a cyclic structure, which are applied onto the surface of a welding wire according to the invention, are described.

The hydrocarbon compounds having a cyclic structure, which have the function of orientation, include not only those having carbon—carbon single bonds, but also those having a benzene ring structure and unsaturation bonds such as a double bond. Examples of the hydrocarbon compounds having a benzene ring structure or unsaturation bonds such as a double bond include phthalic acid derivatives such as diethyl phthalate of the formula, $C_6H_4(C_2H_5OOC)_2$, dibutyl phthalate of the formula, $C_6H_4(C_4H_9OOC)_2$, and dioctyl phthalate of the formula, $C_6H_4(C_8H_{17}OOC)_2$. The cyclic structure may be constituted of atoms including, aside from carbon, oxygen, nitrogen, sulfur or phosphorus, and these atoms likewise have the function of orientation. The hydrocarbon compounds whose cyclic structure has such atoms as mentioned above include, for example, furan, allied compounds and derivatives thereof. Moreover, if the hydrocarbon compounds have a cyclic structure, the compounds are oriented such that the plane of the ring is in parallel to the wire surface. When the ring is constituted of 3 or more carbon atoms, the effects of the invention can be expected.

Naphthenic acid is a mixture of compounds obtained from naphthene distillate of petroleum oil. Although those compounds having a linear hydrocarbon chain are frequently employed, significant effects can be expected in the practice of the invention when using naphthenic acid or its salt having a ring structure such as a five-membered ring or a six-membered ring. If linear naphthenic acid or its salt, which is inevitably incorporated, was used along with cyclic naphthenic acid or its salt, the effect of the cyclic naphthenic acid or its salt as a paste was not adversely influenced.

As having set out hereinbefore, linear or branched higher fatty acids having a large number of carbon atoms or salts thereof, e.g. stearic acid or its metal salt, were extensively tested, but significant effects could not be attained. Presumably, this is because such higher fatty acids or salts thereof have a larger number of carbon atoms than as required, and thus they are unlikely to be oriented on the wire surface. On the other hand, although cyclic fatty acids or salts thereof have a large number of carbon atoms, they are cyclic in structure wherein the carbon chain is apparently-short in length and is permitted to be easily oriented on the wire surface.

The application of a metal salt of stearic acid on a wire surface brought about slippage of the wire at feed rollers therefor. The reason for this is considered as follows: as will be apparent from the fact that metal salts of fatty acids having such a great molecular weight as metal stearates have been employed as a lubricant for wire drawing, application of a metal salt of a fatty acid having a great molecular weight onto a wire surface tends to form a strong, thick film on the wire surface. The film of such metal salts of higher fatty acids is very likely to induce the slippage of a wire at feed rollers in the course of automatic welding or semi-automatic welding.

Cyclic fatty acids or salts thereof have slip properties and can improve the feedabilities of a wire. Further, they are very effective for use as a paste for fixing a lubricating material to a wire surface, thereby improving the wire feedabilities. Thus, one is enabled to carry out welding while stably feeding a welding wire at a low feed resistance without causing a spring line to be clogged therein in the course of welding over a long time.

Since lower fatty acids or salts thereof, or cyclic fatty acids or salts thereof are used as a kind of a paste or binder, it is preferred from the ideal standpoint that the surfaces of a wire obtained after wire drawing is washed and applied with a lower fatty acid or its salt, or a cyclic fatty acid or its salt, followed by further application of a lubricating oil and/or lubricating particles for improvement of feedabilities. Nevertheless, a lower fatty acid or its salt, or a cyclic fatty acid or its salt may be used as a lubricant for wire drawing at a final stage of wire drawing, and the resultant wire may be subjected to the further application as mentioned above. Only for the simplification of a surface treating process, a lower fatty acid or its salt, or a cyclic fatty acid or its salt, a lubricating oil and lubricating particles may be mixed together and applied to at one time. Particles such as of molybdenum disulfide usually serve as a good extreme-pressure lubricant. Accordingly, wire drawing is carried out by use of molybdenum disulfide or the like, followed by further application of a mixture of a lower fatty acid or its salt, or a cyclic fatty acid or its salt and a lubricating material.

The manner of the application may be performed by contact coating on a wire surface by use, for example, of a buff, or by immersing a wire in a solution of necessary components and buffing to make a uniform coat. Alternatively, the application may be electrostatically effected in a noncontact manner. If it is possible to uniformly dissolve or disperse a lower fatty acid or its salt, or a cyclic fatty acid or its salt, a lubricating oil and lubricating particles, the resultant solution or dispersion may be applied onto a wire at one time. If a uniform solution or dispersion cannot be obtained, these components may be separately applied to. In order to improve the stability and application operations of a solution or dispersion made of a lower fatty acid or its salt, or a cyclic fatty acid or its salt, a lubricating oil and lubricating particles, surface active agents such as glycols, esters and the like may be added to the coating solution or dispersion.

It will be noted that good wire feedabilities are ensured when a lower fatty acid or its salt, or a cyclic fatty acid or its salt is present on the wire surface in an amount of 0.001 to 2 g per 10 kg of the wire, and when the total amount of deposits of a lower fatty acid or its salt, or a cyclic fatty acid or its salt, and a lubricating oil and/or lubricating particles is in the range of 0.1 g to 5 per 10 kg of the wire. In these ranges, the amount of matters clogged such as in a conduit tube is at a level of no problem when welding is continued over a long time.

EXAMPLES

Welding wires of the invention were made, and the results of comparison of their characteristic properties with those of comparative examples are described.

Initially, metal hoops indicated by M1 and M2, which, respectively, had compositions indicated in Table 1 below, were packed with a combination of fluxes for carbon steel indicated by F1 and F2 and, respectively, having compositions indicated in Table 2, thereby providing basic wires. These wires were each subjected to wire drawing to obtain flux-cored wires for carbon steels with wire diameters of 1.2, 1.4 and 1.6 mm. It will be noted that, as shown in Table 2 below, the fluxes act to increase or decrease the content by wt % of Fe powder, and the fluxes were packed in the hoop so that the weight of the fluxes per total weight of the wire (i.e. flux rate) was set at 12 and 14 wt %.

TABLE 1

| Symbol for | Chemical Composition of Hoop (wt %) | | | | |
|---|---|---|---|---|---|
| Hoop | C | Si | Mn | P | S |
| M1 | 0.08 | 0.8 | 0.7 | 0.009 | 0.005 |
| M2 | 0.01 | 0.04 | 1.5 | 0.013 | 0.005 |

TABLE 2

| Symbol for | Chemical Composition of Flux for Carbon Steel (wt %) | | | | |
|---|---|---|---|---|---|
| Flux | Fe | Mn | Other Metal Powder | Oxide | Other Compounds |
| F1 | 35 | 10 | 3 | 45 | 7 |
| F2 | 55 | 10 | 3 | 30 | 2 |

The basic wires, which are, respectively, indicated by B1 and B2 and have compositions indicated in Table 3 below, were subjected to wire drawing to obtain solid wires for carbon steel having wire diameters of 0.8 and 1.6 mm, respectively.

TABLE 3

| | Chemical Composition of Solid Wire for Carbon Steel (wt %) | | | | | | | |
|---|---|---|---|---|---|---|---|---|
| Symbol | C | Si | Mn | P | S | Cr | Mo | Ti |
| B1 | 0.04 | 0.8 | 1.2 | 0.010 | 0.02 | 0.03 | — | 0.2 |
| B2 | 0.09 | 1.0 | 1.2 | 0.011 | 0.006 | 0.6 | 0.4 | 0.03 |

Fluxes for stainless steel having compositions indicated in table 5 and indicated by F3 and F4 were combined and packed in hoops M3 and M4, which, respectively, had compositions indicated in Table 4 below, thereby providing basic wires. The wires were each subjected to wire drawing to obtain flux-cored wires for stainless steel having wire diameters of 1.2 to 1.6 mm. The fluxes were packed in the respective hoops so that the weight of the fluxes per total weight of the wire (i.e. flux rate) was set at 15 to 25 wt %.

TABLE 4

| Symbol for | Chemical Composition of Hoop (wt %) | | | | | | |
|---|---|---|---|---|---|---|---|
| Hoop | C | Si | Mn | P | S | Ni | Cr |
| M3 | 0.02 | 0.4 | 1.2 | 0.015 | 0.015 | 8.1 | 19.2 |
| M4 | 0.03 | 0.4 | 1.3 | 0.019 | 0.003 | 9.5 | 20.1 |

TABLE 5

| Symbol for | Chemical Composition of Flux for Stainless Steel (wt %) | | | | | |
|---|---|---|---|---|---|---|
| Flux | Fe | Ni | Cr | Other Metal Powder | Oxide | Other Compounds |
| F3 | 7 | 18 | 40 | 6 | 26 | 3 |
| F4 | 10 | 15 | 38 | 10 | 23 | 4 |

Moreover, basic wires B3 to B5 having compositions indicated in Table 6 were each subjected to wire drawing to obtain solid wires for stainless steel having wire diameters of 0.8 to 1.6 mm.

TABLE 6

| | Chemical Composition of Solid Wire for Stainless Steel (wt %) | | | | | | | | |
|---|---|---|---|---|---|---|---|---|---|
| Symbol | C | Si | Mn | P | S | Ni | Cr | Mo | Nb |
| B3 | 0.04 | 0.4 | 2.0 | 0.015 | 0.010 | 9.5 | 20.0 | — | — |
| B4 | 0.02 | 0.3 | 2.3 | 0.025 | 0.011 | 12.4 | 19.5 | 3.0 | — |
| B5 | 0.04 | 0.4 | 1.9 | 0.019 | 0.015 | 10.0 | 20.1 | — | 0.7 |

Next, a plurality of wires were selected from those flux-cored wires for carbon steel, solid wires for carbon steel, flux-cored wires for stainless steel, and solid wires for stainless steel. As lower fatty acids or salts thereof, there were selected pentanoic acid, octylic acid, caprylic acid, lauric acid, linderic acid and metal salts thereof, as shown in Table 7, because of their inexpensiveness and easiest industrial availability. A lubricating oil and lubricating particles were mixed with a selected fatty acid or its salt, and the mixed dispersion was applied onto each wire surface. Moreover, naphthenic acid was selected as a cyclic fatty acid because of its inexpensiveness and easiest industrial availability, and metal salts of naphthenic acid selected were those containing metals selected from the group consisting of K, Mn, Fe, Co, Cu, Sn, Cs and Pb. In addition, at least one member selected from diethyl phthalate, dibutyl phthalate, dioctyl phthalate, and furan compounds was provided as a cyclic structure-bearing hydrocarbon compound other than naphthenic acid. The naphthenic acid, its metal salt or other type of hydrocarbon compound having a cyclic structure was mixed with a lubricating oil and lubricating particles for feed improvers. The resultant mixed dispersion was applied onto a wire surface. When a linear fatty acid or its salt was incorporated in the cyclic fatty acids in small amounts, the effect of the cyclic fatty acids or their salts as a binder or paste was not impeded.

The lubricating oil used as a feed improver was one which was selected from the group consisting of animal oils, plant oils, mineral oils, synthetic oils and mixtures thereof. The lubricating particles used were made of a lubricating substance selected from the group consisting of molybdenum disulfide, tungsten disulfide, graphite carbon, polytetrafluoroethylene and mixtures thereof. For comparison, higher fatty acid salts, such as potassium stearate and sodium stearate, and potassium acetate were used and applied onto a wire surface.

TABLE 7-1

| Fatty acid | Number of Carbon Atoms | Free Acid | Co | Pb | Mn | K | Na |
|---|---|---|---|---|---|---|---|
| Pentanoic acid | 5 | ○ | ○ | ○ | — | — | — |
| Caproic acid | 6 | ○ | — | ○ | — | — | — |
| Octylic acid | 8 | ○ | — | ○ | ○ | ○ | — |
| Secanoic acid | 7–10 | ○ | — | — | ○ | ○ | — |
| Caprylic acid | 10 | ○ | ○ | — | ○ | — | — |
| Lauric acid | 12 | ○ | — | ○ | — | ○ | — |
| Linderic acid | 12 | ○ | — | — | ○ | ○ | ○ |
| Stearic acid | 18 | — | — | — | — | ○ | ○ |
| Acetic acid | 2 | — | — | — | — | ○ | — |

TABLE 7-2

| Fatty acid | Zn | Ca | Sn | Zr | Fe | Mg | Li | Cu |
|---|---|---|---|---|---|---|---|---|
| Pentanoic acid | — | — | — | — | — | ○ | — | — |
| Caproic acid | — | — | — | — | ○ | — | — | — |
| Octylic acid | — | — | — | ○ | — | — | ○ | — |
| Secanoic acid | — | — | — | — | — | — | — | ○ |
| Caprylic acid | — | — | ○ | — | — | — | — | — |
| Lauric acid | ○ | — | — | — | — | — | — | — |
| Linderic acid | — | ○ | — | — | — | — | — | — |
| Stearic acid | — | — | — | — | — | — | — | — |
| Acetic acid | — | — | — | — | — | — | — | — |

TABLE 7-3

| Fatty acid | Ni | Ce | Cs | Ti | Al |
|---|---|---|---|---|---|
| Pentanoic acid | — | — | — | — | — |
| Caproic acid | — | — | — | — | — |
| Octylic acid | ○ | ○ | ○ | — | — |
| Secanoic acid | — | — | — | — | — |
| Caprylic acid | — | — | — | — | — |
| Lauric acid | — | — | — | ○ | — |
| Linderic acid | — | — | — | — | ○ |
| Stearic acid | — | — | — | — | — |
| Acetic acid | — | — | — | — | — |

It will be noted that the presence or absence of a lower fatty acid or its salt, or a cyclic fatty acid or its salt was confirmed in the following manner. A wire was washed with a volatile organic solvent, and the resultant solvent wash was subjected to analyses, such as nuclear magnetic resonance analysis and mass spectrometric analysis, to isolate the lower fatty acid or its salt, or a cyclic fatty acid or its salt from a lubricating oil and lubricating particles. It will also be noted that naphthenic acid and salts thereof emanates a peculiar aroma, and whether or not a trace of the acid or salt is attached to a wire can be quantitatively determined from the aroma. Accordingly, the presence of naphthenic acid and salts thereof can be readily distinguished from other fatty acids on the manufacturing spot. The use of such an acid and salts is preferred because it can be prevented to apply them to in error.

In the examples, chain hydrocarbon compounds including caprylic acid, lauric acid, linderic acid and metal linderates were mixed with lubricating materials (i.e. lubricating oils and lubricating particles). Each mixed dispersion or solution was applied onto a wire surface. With regard to the other chain compounds, each compound was applied onto a wire surface, and then, lubricating materials were selectively applied onto the wire surface. Naphthenic acid or its metal salts were each applied to after mixing with a lubricating oil and lubricating particles, or after mixing with a lubricating oil alone.

Subsequently, each wire was subjected to continuous welding over 30 minutes by used of an automatic welding machine to check the influence, on the wire feedabilities, of a deposit on a wire surface. The wire feedabilities were evaluated by checking a feed resistance, the stability of the feed resistance, and the degree of clogging in a spring liner caused by separation of a deposit from the wire surface.

Figure 4:
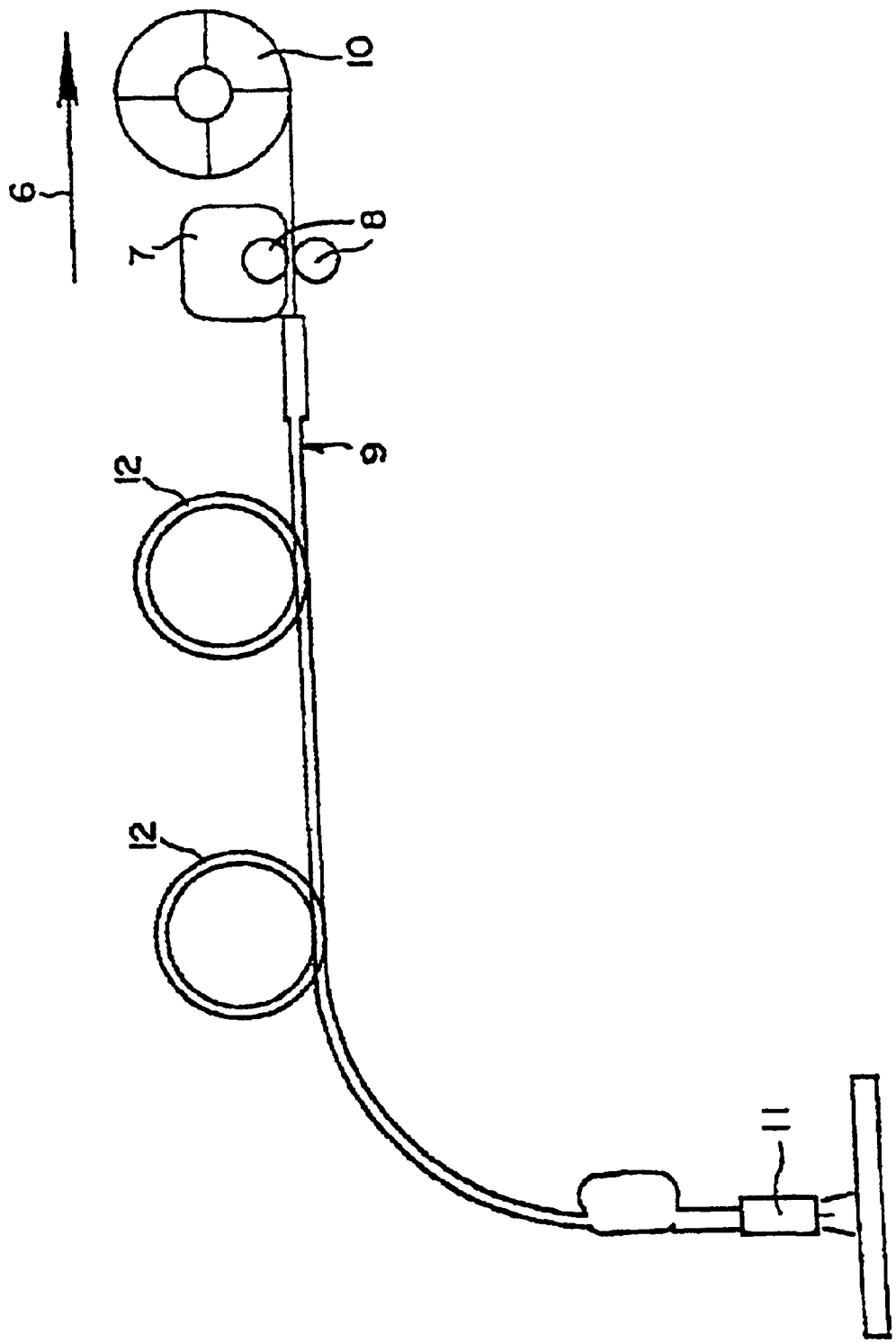
FIG. 4 is a schematic view showing a welding apparatus used in examples of the invention.

Reference is now made to FIG. 4, which is a schematic view showing an automatic welding machine used in these examples. As shown in FIG. 4, a spool 10, about which a welding wire is wound, is placed while keeping its axis horizontal. Pair of feed rollers 8 for feeding the wire stand adjacent to the spool 10. The paired feed rollers 8 are driven with a wire feed motor 7. A conduit cable 9 is provided along a horizontal extension line of the welding wire, which is fed from the feed rollers 8. Two turns 12 are provided on the way of the conduit cable 9, with a torch being disposed at the tip of the cable 9.

When using this welding machine, the welding wire fed from the spool 10 is horizontally fed by means of the feed rollers 8, and arrives via the conduit cable 9 and the two turns 5 at the torch 11 wherein it serves for welding.

The feed resistance and the degree of clogging in the spring line of the conduit cable were, respectively, measured by carrying out welding in the following manner: the conduit cable was set at 6 m in length, and the diameter of the two turns 12 was determined at 400 mm. The feed resistance was evaluated as a force (arrow 6), which the feed rollers 8 suffered from the wire in a direction opposite to the feed direction at the time of welding. The stability of the feed resistance in relation to time was evaluated in the course of the continuous welding. The degree of clogging of a lubricating material in the spring line was evaluated as an increase in weight of the spring line after the continuous welding over 30 minutes.

The fabricating conditions of the wires and the deposits on the wire surface are shown in Table 8 below. The results of the evaluation of the wire feedabilities are shown in Table 9. The feed resistance shown in Table 9 is an average value of resistance measurements, in which ⊙ indicates an average value of 5 kgf or below, ○ indicates an average value exceeding 5 kgf but not greater than 8 kgf, Δ indicates an average value exceeding 8 kgf, and X means a non-feedable wire. The feed resistance stability indicates a variation of the feed resistance, and ⊙ indicates a variation of 1 kgf or below, ○ indicates a variation exceeding 1 kgf but not greater than 2 kgf, Δ indicates a variation exceeding 2 kgf but not greater than 5 kgf, and X indicates a variation exceeding 5 kgf. The evaluation standards for the degree of clogging are such that ○ indicates an amount of clogging of 0.002 g or below, ⊙ indicates an amount exceeding 0.002 g but not greater than 0.005 g, Δ indicates an amount exceeding 0.005 g but not greater than 0.01 g, and X indicates an amount not less than 0.01 g.

TABLE 8-1

| Example No. | Wire/Flux Weight (wt %) | Fatty Acid or Salt thereof | Feed Oil | Lubricating Particles | Amount of Deposited Fatty acid or Salt thereof (g) | Total of Deposits (g) |
|---|---|---|---|---|---|---|
| 1 | M2/F1, 15% | pentanoic acid | plant oil | $WS_2$ + C | 0.2 | 1.2 |
| 2 | M2/F2, 14% | cobalt pentanoate caproic acid | mineral oil synthetic oil | nil | 0.09 | 0.5 |
| 3 | B1 | lead pentanoate | synthetic oil | $MoS_2$ | 0.002 | 2.1 |
| 4 | B4 | lead octylate | mineral oil | $WS_2$ | 0.005 | 0.2 |
| 5 | B1 | manganese octylate secainoic acid | animal oil synthetic oil | nil | 0.3 | 0.9 |
| 6 | B2 | potassium octylate | plant oil | $MoS_2$ + C | 0.2 | 1.3 |
| 7 | B1 | octylic acid pottassium octylate | | | 0.6 | 0.6 |
| 8 | M3/F4, 22% | cobalt caprylate | plant oil synthetic oil | polytetrafluoro-ethylene $MoS_2$ | 1.5 | 3.9 |
| 9 | B5 | manganese caprylate | synthetic oil | nil | 1.9 | 4.9 |
| 10 | M3/F3, 16% | caprylic acid zinc laurate | plant oil synthetic oil | polytetrafluoro ethylene | 0.6 | 3.1 |
| 11 | B3 | manganese caprylate tin caprylate potassium octylate | mineral oil synthetic oil | $WS_2$ $MoS_2$ | 0.1 | 2.5 |

TABLE 8-2

| Example No. | Wire/Flux Weight (wt %) | Fatty Acid or Salt thereof | Feed Oil | Lubricating Particles | Amount of Deposited Fatty acid or Salt thereof (g) | Total of Deposits (g) |
|---|---|---|---|---|---|---|
| 12 | M4/F4, 19% | lauric acid | synthetic oil | polytetrafluoro ethylene | 0.07 | 0.9 |
| 13 | M2/F1, 14% | lead laurate | plant oil | nil | 0.008 | 0.3 |
| 14 | B4 | potassium laurate manganese octylate | plant oil mineral oil | $MoS_2$ polytetrafluoro-ethylene | 0.4 | 1.6 |
| 15 | B1 | lindric acid | mineral oil | $MoS_2$ | 0.4 | 2.0 |
| 16 | M2/F1, 14% | manganese linderate | plant oil | $MoS_2$ | 1.1 | 3.2 |
| 17 | B2 | potassium linderate | synthetic oil | $MoS_2$ | 0.04 | 1.2 |
| 18 | B1 | zinc laurate | plant oil | $MoS_2$ | 0.003 | 0.8 |
| 19 | B4 | calcium linderate | synthetic oil | nil | 0.09 | 0.2 |
| 20 | M1/F1, 13% | tin caprylate | mineral oil | $MoS_2$ polytetrafluoro-ethylene | 0.08 | 1.5 |
| 21 | B2 | zirconium octylate | plant oil | $MoS_2$ | 1.9 | 2.3 |
| 22 | M2/F2, 14% | iron caproate | plant oil animal oil | $WS_2$ | 0.5 | 1.6 |
| 23 | B1 | manganese pentanoate | synthetic oil | $MoS_2$ | 1.2 | 3.5 |
| 24 | B1 | lithium octylate | synthetic oil plant oil | $MoS_2$ | 1.8 | 4.1 |

TABLE 8-3

| Example No. | Wire/Flux Weight (wt %) | Fatty Acid or Salt thereof | Feed Oil | Lubricating Particles | Amount of Deposited Fatty acid or Salt thereof (g) | Total of Deposits (g) |
|---|---|---|---|---|---|---|
| 25 | B3 | copper secanoate | mineral oil plant oil | $WS_2$ | 0.008 | 0.8 |
| 26 | M3/F4, 19% | nickel octylate | animal oil | polytetrafluoro-ethylene | 0.6 | 1.2 |
| 27 | B2 | aluminium linderate | plant oil | $MoS_2$ $WS_2$ | 0.3 | 1.8 |

TABLE 8-3-continued

| Example No. | Wire/Flux Weight (wt %) | Fatty Acid or Salt thereof | Feed Oil | Lubricating Particles | Amount of Deposited Fatty acid or Salt thereof (g) | Total of Deposits (g) |
|---|---|---|---|---|---|---|
| 28 | B5 | titanium laurate | plant oil | nil | 0.08 | 0.4 |
| 29 | M4/F3, 20% | cesium octylate | synthetic oil | polytetrafluoroethylene | 0.03 | 3.1 |
| 30 | B1 | cesium octylate | mineral oil | polytetrafluoroethylene | 0.1 | 0.9 |

TABLE 8-4

| Example No. | Wire/Flux Weight (wt %) | Fatty Acid or Salt thereof | Feed Oil | Lubricating Particles | Amount of Deposited Cyclic Hydrocarbon (g) | Total of Deposits (g) |
|---|---|---|---|---|---|---|
| 31 | M1/F1; 13% | iron naphthenate | plant oil | nil | 0.002 | 0.15 |
| 32 | M1/F2, 15% | cobalt naphthenate + chromium naphthenate | mineral oil + plant oil | nil | 0.1 | 2.2 |
| 33 | B2 | naphthenic acid + potassium naphthenate | nil | nil | 1.2 | 1.2 |
| 34 | B4 | cesium naphthenate | mineral oil | $MoS_2$ | 1.8 | 4.8 |
| 35 | B1 | manganese naphthenate + zirconium naphthenate | mineral oil + synthetic oil | nil | 0.9 | 3.5 |
| 36 | B1 | potassium naphthenate + naphthenic acid | nil | $MoS_2$ | 0.5 | 1.8 |
| 37 | B2 | lead naphthenate + zinc naphthenate | synthetic oil + plant oil | $WS_2$ | 1.9 | 4.9 |
| 38 | M4/F4, 22% | cesium naphthenate + manganese naphthenate | mineral oil + synthetic oil | $MoS_2$ $WS_2$ | 0.1 | 0.3 |
| 39 | B5 | tin naphthenate + sodium naphthenate + aluminium naphthenate | synthetic oil | nil | 1.1 | 3.5 |
| 40 | M3/F4, 16% | naphthenic acid + potassium naphthenate + pottasium octylate | animal and plant oil + mineral oil | $MoS_2$ + C | 0.01 | 1.0 |
| 41 | B3 | tin naphthenate + calcium naphthenate | mineral oil + synthetic oil | $WS_2$ $MoS_2$ | 0.009 | 0.5 |

TABLE 8-5

| Example No. | Wire/Flux Weight (wt %) | Fatty Acid or Salt thereof | Feed Oil | Lubricating Particles | Amount of Deposited Cyclic Hydrocarbon (g) | Total of Deposits (g) |
|---|---|---|---|---|---|---|
| 42 | M4/F3, 20% | naphthenic acid | nil | nil | 0.8 | 0.8 |
| 43 | M1/F2, 18% | lead naphthenate + nickel naphthenate | plant oil | nil | 1.3 | 2.9 |
| 44 | B4 | potassium naphthenate + lithium naphthenate | aminal and plant oil + mineral oil | $MoS_2$ polytetrafluoroethylene | 0.2 | 1.2 |
| 45 | B2 | copper naphthenate | mineral oil | nil | 0.0015 | 0.8 |
| 46 | M2/F1, 13% | manganese naphthenate | plant oil | $WS_2$ + C | 0.09 | 1.2 |

TABLE 8-5-continued

| Example No. | Wire/Flux Weight (wt %) | Fatty Acid or Salt thereof | Feed Oil | Lubricating Particles | Amount of Deposited Cyclic Hydro carbon (g) | Total of Deposits (g) |
|---|---|---|---|---|---|---|
| 47 | B1 | potassium naphthenate + titanium naphthenate + cesium naphthenate | animal and plant oil | MoS$_2$ | 1.1 | 2.9 |
| 48 | B1 | diethyl phthalate | plant oil | nil | 0.2 | 1.3 |
| 49 | B2 | dibutyl phthalate | plant oil | nil | 0.09 | 2.0 |
| 50 | B3 | dioctyl phthalate | synthetic oil | nil | 0.4 | 1.5 |
| 51 | B4 | furan compound | nil | nil | 1.2 | 1.2 |

TABLE 8-6

| Comparative Example No. | Wire/Flux Weight (wt %) | Fatty Acid or Salt thereof | Feed Oil | Lubricating Particles | Amount of Deposited Fatty acid or Salt thereof (g) | Total of Deposits (g) |
|---|---|---|---|---|---|---|
| 52 | M1/F1, 13% | potassium stearate | plant oil | nil | 0.2 | 1.2 |
| 53 | M1/F2, 14% | potassium acetate | plant oil mineral oil | MoS$_2$ | 0.1 | 0.9 |
| 54 | B1 | sodium stearate | animal oil | MoS$_2$ | 0.5 | 2.2 |
| 55 | B2 | nil | plant oil synthetic oil | WS$_2$ | 0 | 0.9 |
| 56 | M3/F4, 18% | potassium stearate | mineral oil | nil | 0.3 | 1.2 |
| 57 | M4/F4, 20% | nil | synthetic oil | polytetrafluoro-ethylene | 0 | 1.1 |
| 58 | B3 | sodium stearate | mineral oil synthetic oil | MoS$_2$ | 1.1 | 2.0 |
| 59 | B5 | nil | plant oil | WS$_2$ | 0 | 0.8 |

TABLE 8-7

| Comparative Example No. | Wire/Flux Weight (wt %) | Fatty Acid or Salt thereof | Feed Oil | Lubricating Particles | Amount of Deposited Cyclic Hydro carbon (g) | Total of Deposits (g) |
|---|---|---|---|---|---|---|
| 60 | M2/F1, 13% | sodium stearate | synthetic oil | nil | 0.2 | 1.5 |
| 61 | M2/F2, 14% | nil | synthetic oil + mineral oil | WS$_2$ | 0 | 3.2 |
| 62 | B2 | potassium stearate | plant oil | MoS$_2$ | 0.01 | 0.08 |
| 63 | B1 | potassium stearate | plant oil + synthetic oil | MoS$_2$ | 0.8 | 1.9 |
| 64 | M3/F4, 18% | nil | mineral oil | nil | 0 | 1.5 |
| 65 | M4/F4, 20% | potassium stearate | mineral oil | polytetrafluoro-ethylene | 0.08 | 2.0 |
| 66 | B3 | calcium stearate | mineral oil + synthetic oil | WS$_2$ | 1.3 | 5.1 |
| 67 | B5 | sodium stearate | animal and plant oil | MoS$_2$ | 0.3 | 1.0 |

TABLE 9-1

| Example No. | Feed Resistance | Feed Resistance Stability | Degree of Clogging |
|---|---|---|---|
| 1 | ○ | ⊙ | ○ |
| 2 | ○ | ○ | ⊙ |
| 3 | ○ | ⊙ | ○ |
| 4 | ○ | ○ | ⊙ |
| 5 | ○ | ○ | ⊙ |
| 6 | ○ | ⊙ | ○ |
| 7 | ○ | ○ | ⊙ |
| 8 | ○ | ⊙ | ○ |

TABLE 9-1-continued

| Example No. | Feed Resistance | Feed Resistance Stability | Degree of Clogging |
|---|---|---|---|
| 9 | ○ | ○ | ○ |
| 10 | ○ | ⊚ | ○ |
| 11 | ○ | ⊚ | ○ |

TABLE 9-2

| Example No. | Feed Resistance | Feed Resistance Stability | Degree of Clogging |
|---|---|---|---|
| 12 | ⊚ | ⊚ | ○ |
| 13 | ○ | ⊚ | ⊚ |
| 14 | ⊚ | ⊚ | ○ |
| 15 | ⊚ | ⊚ | ○ |
| 16 | ⊚ | ⊚ | ○ |
| 17 | ⊚ | ⊚ | ○ |
| 18 | ○ | ⊚ | ○ |
| 19 | ○ | ○ | ⊚ |
| 20 | ⊚ | ⊚ | ⊚ |
| 21 | ⊚ | ⊚ | ○ |
| 22 | ⊚ | ⊚ | ○ |
| 23 | ⊚ | ⊚ | ○ |
| 24 | ⊚ | ⊚ | ○ |
| 25 | ○ | ○ | ○ |
| 26 | ⊚ | ⊚ | ⊚ |
| 27 | ⊚ | ⊚ | ○ |
| 28 | ○ | ○ | ⊚ |
| 29 | ○ | ⊚ | ○ |
| 30 | ⊚ | ⊚ | ⊚ |

TABLE 9-3

| Example No. | Feed Resistance | Feed Resistance Stability | Degree of Clogging |
|---|---|---|---|
| 31 | ○ | ○ | ⊚ |
| 32 | ○ | ○ | ⊚ |
| 33 | ○ | ○ | ⊚ |
| 34 | ○ | ⊚ | ○ |
| 35 | ○ | ○ | ⊚ |
| 36 | ○ | ⊚ | ○ |
| 37 | ○ | ⊚ | ○ |
| 38 | ○ | ⊚ | ○ |
| 39 | ○ | ○ | ⊚ |
| 40 | ⊚ | ⊚ | ○ |
| 41 | ○ | ⊚ | ○ |

TABLE 9-4

| Example No. | Feed Resistance | Feed Resistance Stability | Degree of Clogging |
|---|---|---|---|
| 42 | ○ | ○ | ⊚ |
| 43 | ○ | ○ | ⊚ |
| 44 | ○ | ⊚ | ○ |
| 45 | ○ | ○ | ⊚ |
| 46 | ○ | ⊚ | ○ |
| 47 | ○ | ⊚ | ○ |
| 48 | ○ | ○ | ⊚ |
| 49 | ○ | ○ | ⊚ |
| 50 | ○ | ○ | ⊚ |
| 51 | ○ | ⊚ | ⊚ |

TABLE 9-4

| Comparative Example No. | Feed Resistance | Feed Resistance Stability | Degree of Clogging |
|---|---|---|---|
| 52 | ○ | x | x |
| 53 | △ | △ | x |
| 54 | ○ | △ | x |
| 55 | △ | △ | x |
| 56 | ○ | x | x |
| 57 | △ | △ | X |
| 58 | ○ | △ | X |
| 59 | △ | △ | X |

TABLE 9-6

| Comparative Example No. | Feed Resistance | Feed Resistance Stability | Degree of Clogging |
|---|---|---|---|
| 60 | ○ | x | x |
| 61 | △ | △ | x |
| 62 | x | x | ○ |
| 63 | ○ | △ | x |
| 64 | △ | x | x |
| 65 | ○ | △ | x |
| 66 | ○ | ○ | x |
| 67 | ○ | △ | x |

As will be apparent from Tables 9-1 to 9-6, in the examples of the invention wherein a lower fatty acid or its salt, or a cyclic fatty acid or its salt is deposited on a wire surface, and a lubricating oil or a mixture of a lubricating oil and lubricating particles are chemically combined on the wire surface, the feedabilities of the wire are improved and stabilized, and the degree of clogging of the lubricating material in the spring line can be suppressed to a significant extent. Especially, in Example Nos. 1 to 51, a lower fatty acid or its salt, or a cyclic fatty acid or its salt is present on the wire surface, and the total weight of a deposit made of a lubricating oil and lubricating particles ranges from 0.1 to 5 g per 10 kg of the wire, ensuring very stable feedabilities of the wire.

In contrast, in Comparative Examples 52 and 56, potassium stearate does not permit chemical combination between the wire surface and a lubricating oil, resulting in poor feed stability of the wire. Additionally, the lubricating material is deposited in the spring liner, thereby increasing the amount of a clogged deposit. In Comparative examples 53, 54, 55, 57 and 59, lubricating particles are attached to the wire surface depending only on the wettability of a lubricating oil, so that the lubricating material is deposited in the spring liner, thereby increasing the amount of a clogged deposit. In Comparative Example 58, sodium stearate cannot chemically combine the wire surface and the lubricating oil therethrough, and the lubricating particles are attached to the wire surface depending only on the wettability of the lubricating oil. Thus, the lubricating material is deposited in the spring liner, thereby causing the liner to be clogged. Comparative Example 60 makes use of sodium stearate, which cannot chemically combine the wire surface and the lubricating oil therethrough, resulting in poor wire feed stability. Thus, lubricating material is deposited in the spring liner, thereby causing the liner to be clogged. In Comparative Examples 62, 63 and 65, potassium stearate cannot permit combination between the wire surface and the lubricating oil, under which lubricating particles are attached to the wire surface depending only on the wettability of the lubricating oil. Thus, the lubricating material is deposited in the spring liner, thereby causing the liner to be clogged. In Comparative Example 66, calcium stearate is used and does not permit combination between the wire surface and the lubricating oil, under which lubricating particles are attached to the wire surface depending only on the wettability of the lubricating oil. Thus, the lubricating material is deposited in the spring liner, thereby causing the liner to be clogged.

Moreover, in Comparative Example 64, the lubricating oil alone is applied onto a wire surface, so that the wire cannot be fed stably, with the wire feed resistance being unsatisfactory and the degree of clogging in the spring line being not suppressed to a satisfactory extent. In Comparative Example 67, sodium stearate is used and cannot chemically combine the wire surface and the lubricating oil therethrough. The lubricating particles are attached to the wire surface depending only on the wettability of the lubricating oil. The feed stability of the wire is not satisfactory, and the lubricating material is deposited in the spring liner, thereby causing the liner to be clogged therewith.

As set out in detail hereinbefore, when chain compounds having from 5 to 12 carbon atoms or hydrocarbon compounds having a cyclic structure are present on the surface of a wire, they permit chemical combination between the lubricating material made of a lubricating oil and/or lubricating particles and the wire surface. Thus, the lubricating material is very unlikely to separate from the wire surface, resulting in improved feedabilities of the wire. When the wire is used for welding over a long time, little inconvenience, which would otherwise be caused through clogging of the lubricating material, is experienced, thereby ensuring stable feed of the wire. The presence of the lubricating material on the wire surface contributes to very good feed stability of the wire.

What is claimed is:

1. A welding wire, comprising:
   a wire having a wire surface; and
   a deposit on the wire surface,
   wherein the deposit comprises
      at least one lubricating particle, and
   at least one compound selected from the group consisting of (a) saturated or unsaturated, linear or branched, carboxylic acid having from 5 to 12 carbon atoms;
   and wherein the at least one lubricating particle comprises a material selected from the group consisting of molybdenum disulfide, tungsten disulfide, graphite carbon and polytetrafluoroethylene.

2. The welding wire according to claim 1, wherein the carboxylic acid is selected from the group consisting of pentanoic acid, caproic acid, caprylic acid, octylic acid, secanoic acid, capric acid, decanoic acid, lauric acid, linderic acid and synthetic fatty acids.

3. The welding wire according to claim 1, wherein the deposit further comprises at least one lubricating oil selected from the group consisting of animal and plant oils, mineral oils, and synthetic oils.

4. The welding wire according to claim 3, wherein the carboxylic acid and at least one lubricating particle are present on the wire surface in a total amount of 0.1 to 5 g per 10 kg of the wire.

5. The welding wire according to claim 1, wherein the at least one lubricating particle is molybdenum disulfide.

6. The welding wire according to claim 1, wherein the at least one lubricating particle is tungsten disulfide.

7. The welding wire according to claim 1, wherein the at least one lubricating particle is graphite carbon.

8. The welding wire according to claim 1, wherein the at least one lubricating particle is polytetrafluoroethylene.

9. A method of making welding wire of claim 1, the method comprising:
   coating the wire with the deposit.

10. A welding wire, comprising:
    a wire having a wire surface; and
    a deposit on the wire surface,
    wherein the deposit comprises
       at least one lubricating particle, and
       at least one carboxylic acid selected from the group consisting of pentanoic acid, caproic acid, caprylic acid, octylic acid, secanoic acid, capric acid, decanoic acid, lauric acid, linderic acid and synthetic fatty acids;
    and wherein the at least one lubricating particle comprises a material selected from the group consisting of molybdenum disulfide, tungsten disulfide, graphite carbon and polytetrafluoroethylene.

11. The welding wire according to claim 10, further comprising a metal carboxylate that is a metal salt of a carboxylic acid selected from the group consisting of pentanoic acid, caproic acid, caprylic acid, octylic acid, secanoic acid, capric acid, decanoic acid, lauric acid, linderic acid and synthetic fatty acids; and the metal salt comprises a metal selected from the group consisting of Li, Na, Mg, Al, K, Ca, Ti, Cr, Mn, Fe, Co, Ni, Cu, Zn, Zr, Sn, Cs, Pb and Ce.

12. The welding wire according to claim 10, wherein the deposit further comprises at least one lubricating oil selected from the group consisting of animal and plant oils, mineral oils, and synthetic oils.

13. The welding wire according to claim 12, wherein the at least carboxylic acid and the at least one lubricating particle are present on the wire surface in a total amount of 0.1 to 5 g per 10 kg of the wire.

14. The welding wire according to claim 10, wherein the at least one lubricating particle is molybdenum disulfide.

15. The welding wire according to claim 10, wherein the at least one lubricating particle is tungsten disulfide.

16. The welding wire according to claim 10, wherein the at least one lubricating particle is graphite carbon.

17. The welding wire according to claim 10, wherein the at least one lubricating particle is polytetrafluoroethylene.

18. A method of making welding wire of claim 10, the method comprising:
    coating the wire with the deposit.

19. A welding wire, comprising:
    a wire having a wire surface; and
    a deposit on the wire surface,
    wherein the deposit comprises
       at least one lubricating particle, and
       at least one compound (a) selected from the group consisting of saturated or unsaturated, linear or branched, carboxylic acids having from 5 to 12 carbon atoms;
    wherein a total amount of said carboxylic acid (a) is 0.001 to 2 g per 10 kg of the wire;
    and wherein the at least one lubricating particle comprises a material selected from the group consisting of molybdenum disulfide, tungsten disulfide, graphite carbon and polytetrafluoroethylene;
    wherein the deposit further comprises at least one lubricating oil selected from the group consisting of animal and plant oils, mineral oils, and synthetic oils; and wherein the carboxylic acid and the at least one lubricating particle are present on the wire surface in a total amount of 0.1 to 5 g per 10 kg of the wire.

20. The welding wire according to claim 19, wherein the at least one carboxylic acid is selected from the group consisting of pentanoic acid, caproic acid, caprylic acid, octylic acid, secanoic acid, capric acid, decanoic acid, lauric acid, linderic acid and synthetic fatty acids.

21. The welding wire according to claim 19, further comprising metal salt of a carboxylic acid selected from the group consisting of pentanoic acid, caproic acid, caprylic acid, octylic acid, secanoic acid, capric acid, decanoic acid, lauric acid, linderic acid and synthetic fatty acids; and the metal salt comprises a metal selected from the group consisting of Li, Na, Mg, Al, K, Ca, Ti, Cr, Mn, Fe, Co, Ni, Cu, Zn, Zr, Sn, Cs, Pb and Ce.

22. The welding wire according to claim 19, wherein the at least one lubricating particle is molybdenum disulfide.

23. The welding wire according to claim 19, wherein the at least one lubricating particle is tungsten disulfide.

24. The welding wire according to claim 19, wherein the at least one lubricating particle is graphite carbon.

25. The welding wire according to claim 19, wherein the at least one lubricating particle is polytetrafluoroethylene.

26. A method of making welding wire of claim 19, the method comprising:
coating the wire with the deposit.

27. A welding wire, comprising:
a wire having a wire surface; and
a deposit on the wire surface,
wherein the deposit comprises
at least one lubricating particle, and
at least one compound selected from the group consisting of (a) saturated or unsaturated, linear or branched, carboxylic acid having from 5 to 12 carbon atoms; (b) a metal carboxylate, and the metal is selected from the group consisting of Mg, Al, Ti, Cr, Mn, Fe, Co, Ni, Cu, Zn, Zr, Sn, Pb and Ce, and mixtures of (a) and (b);
and wherein the at least one lubricating particle comprises a material selected from the group consisting of molybdenum disulfide, tungsten disulfide, graphite carbon and polytetrafluoroethylene.

28. The welding wire according to claim 27, wherein the carboxylic acid is selected from the group consisting of pentanoic acid, caproic acid, caprylic acid, octylic acid, secanoic acid, capric acid, decanoic acid, lauric acid, linderic acid and synthetic fatty acids.

29. The welding wire according to claim 27, wherein the deposit further comprises at least one lubricating oil selected from the group consisting of animal and plant oils, mineral oils, and synthetic oils.

30. The welding wire according to claim 29, wherein the at least one compound and at least one lubricating particle are present on the wire surface in a total amount of 0.1 to 5 g per 10 kg of the wire.

31. The welding wire according to claim 27, wherein the at least one compound is (a) the carboxylic acid, and wherein the carboxylic acid and the at least one lubricating particle are present on the wire surface in a total amount of 0.1 to 5 g per 10 kg of the wire.

32. The welding wire according to claim 27, wherein the at least one compound is the (b) metal carboxyate, and wherein the metal carboxylate and the at least one lubricating particle are present on the wire surface in a total amount of 0.1 to 5 g per 10 kg of the wire.

33. The welding wire according to claim 27, wherein the at least one lubricating particle is molybdenum disulfide.

34. The welding wire according to claim 27, wherein the at least one lubricating particle is tungsten disulfide.

35. The welding wire according to claim 27, wherein the at least one lubricating particle is graphite carbon.

36. The welding wire according to claim 27, wherein the at least one lubricating particle is polytetrafluoroethylene.

37. A method of making welding wire of claim 27, the method comprising:
coating the wire with the deposit.

38. A welding wire, comprising:
a wire having a wire surface; and
a deposit on the wire surface,
wherein the deposit comprises
at least one lubricating particle, and
a mixture of (a) and (b);
wherein (a) is a carboxylic acid selected from the group consisting of
pentanoic acid, caproic acid, caprylic acid, octylic acid, secanoic acid, capric
acid, decanoic acid, lauric acid, linderic acid and synthetic fatty acids; and
wherein (b) is a metal carboxylate that is a metal salt of a carboxylic acid
selected from the group consisting of pentanoic acid, caproic acid, caprylic
acid, octylic acid, secanoic acid, capric acid, decanoic acid, lauric acid,
linderic acid and synthetic fatty acids;
wherein a total amount of said carboxylic acid (a), said metal carboxylate (b) or said mixture of (a) and (b) is 0.001 to 2 g per 10 kg of the wire;
and wherein the at least one lubricating particle comprises a material selected from the group consisting of molybdenum disulfide, tungsten disulfide, graphite carbon and polytetrafluoroethylene.

39. The welding wire according to claim 38, wherein the metal salt comprises a metal selected from the group consisting of Li, Na, Mg, Al, K, Ca, Ti, Cr, Mn, Fe, Co, Ni, Cu, Zn, Zr, Sn, Cs, Pb and Ce.

40. The welding wire according to claim 38, wherein the deposit further comprises at least one lubricating oil selected from the group consisting of animal and plant oils, mineral oils, and synthetic oils.

41. The welding wire according to claim 40, wherein the at least one compound and at least one lubricating particle are present on the wire surface in a total amount of 0.1 to 5 g per 10 kg of the wire.

42. The welding wire according to claim 38, wherein the mixture of (a) and (b) and the at least one lubricating particle are present on the wire surface in a total amount of 0.1 to 5 g per 10 kg of the wire.

43. The welding wire according to claim 38, wherein the at least one lubricating particle is molybdenum disulfide.

44. The welding wire according to claim 38, wherein the at least one lubricating particle is tungsten disulfide.

45. The welding wire according to claim 38, wherein the at least one lubricating particle is graphite carbon.

46. The welding wire according to claim 38, wherein the at least one lubricating particle is polytetrafluoroethylene.

47. A method of making welding wire of claim 38, the method comprising:
coating the wire with the deposit.

* * * * *